United States Patent
Shupe

[11] 3,786,367
[45] Jan. 15, 1974

[54] HOLOGRAPHIC SYSTEM
[75] Inventor: David M. Shupe, Troy, Mich.
[73] Assignee: The Bendix Corporation, Southfield, Mich.
[22] Filed: Oct. 19, 1971
[21] Appl. No.: 190,473

[52] U.S. Cl............................. 331/94.5 C, 350/3.5
[51] Int. Cl............................................. H01s 3/00
[58] Field of Search................ 331/94.5 C; 350/3.5, 350/150

[56] References Cited
UNITED STATES PATENTS

| | | | |
|---|---|---|---|
| 3,518,436 | 6/1970 | DeMaria et al................ | 331/94.5 X |
| 3,577,097 | 5/1971 | Hilberg....................... | 331/94.5 |
| 3,582,815 | 6/1971 | Siebert....................... | 331/94.5 |
| 3,606,517 | 9/1971 | Jacobson et al.............. | 350/3.5 |
| 3,639,855 | 2/1972 | Dillon et al.................. | 331/94.5 |
| 3,656,068 | 4/1972 | Runge........................ | 331/94.5 |

OTHER PUBLICATIONS

Ezuchi et al.: "Simultaneous Mode Locking and Pulse Coupling of the Carbon Dioxide Laser," Applied Physics Letters, Vol. 18, pp. 406–408, May 1, 1971.

LaMacchia: "Stroboscopic Holography with a Mode Locked Laser," Journal of Applied Physics, Vol. 39, pp. 5340–5341, Oct., 1968.

*Primary Examiner*—Edward S. Bauer
*Attorney*—Hugh L. Fisher et al.

[57] ABSTRACT

A holographic system employing a laser having a continuous wave lasing medium. The laser has at each end of its cavity mirrors of substantially 100 percent reflectivity. Pulses of laser energy within the cavity are mode-locked and mode controlled to provide pulse width control. Then the pulses are of a certain polarization and also when located in a certain region of the cavity they are ejected from the cavity at a controlled repetition rate.

4 Claims, 3 Drawing Figures

INVENTOR.
David M. Shupe
BY
Fisher & Schmidt
ATTORNEYS

HOLOGRAPHIC SYSTEM

This invention relates to improvements in lasers and particularly in lasers adaptable, although not exclusively, for incorporation in a holographic system.

Each application of a laser generally requires certain parameters for optimum efficiency. For example, and without limitation, if high quality holograms are to be made, the width of the pulses of laser energy must be neither too wide nor too narrow. If acousto-optic beam deflectors are used, they tend to shift the frequency of the beams passing through them and when the pulses are too wide this causes a reduction in the holographic fringe visibility. When, on the other hand, the pulses are too narrow, the timing of the recombination of the reference and object beams becomes critical. Other concerns include pulse repetition rate control without having to resort to inefficient methods such as lengthing the cavity or using an external optical shutter that discards all but a selected few of the pulses.

With the foregoing in mind, a lasing system is contemplated wherein a continuous wave lasing medium is utilized in the laser cavity and the output pulses of laser energy therefrom are controlled in a new and different way both in width and repetition rate.

Also contemplated is a lasing system of the foregoing type wherein the controls therefor afford in a unique way synchronization of the location the pulses traveling in the cavity and their polarization with an electrical signal prior to ejectment from the cavity at a selected rate.

Further contemplated is a laser system providing narrow output pulse widths at a medium repetition rate.

Another Another object is the provision of a laser utilizing a continuous wave lasing medium and that controls pulse widths and pulse repetition rates with a minimum of parts.

Other objectives include the provision of a holographic system employing a continuous wave laser having pulse width and repetition rate controls adapted to variably achieve optimum fringe visibility at the hologram.

The foregoing and other objects and advantages of the invention will become apparent from the following description and the accompanying drawings, in which.

Figure 1:
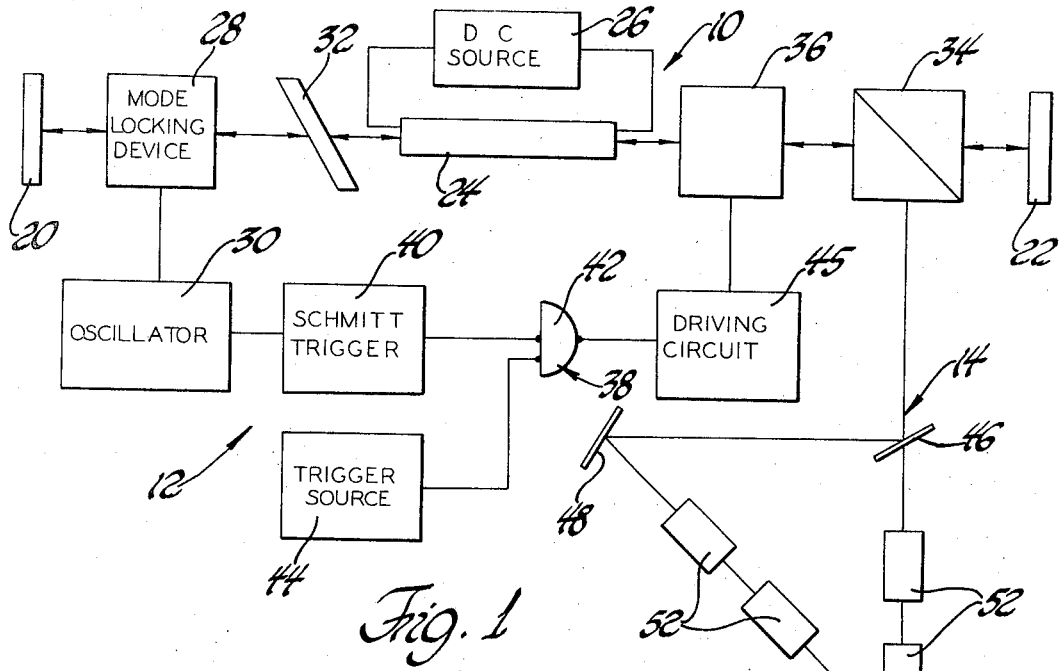
FIG. 1 is a schematic diagram of a holographic system incorporating the principles of the invention.

Referring first to FIG. 1, the numeral 10 denotes a laser, which is operated by a control system, shown generally at 12, to develop optical output pulses of laser energy. These pulses in the FIG. 1 embodiment are, for demonstration purposes, used in the two-beam hologram process. The two beams are developed by an optical system, shown at 14, to make a synthetic hologram on a photographic recording plate 16. The method of generating a synthetic hologram is disclosed in the Marom et al application Ser. No. 116,983, filed Feb. 19, 1971 and entitled Method and Apparatus for Synthesizing a Hologram and reference can be made thereto for a detailed description. Briefly, a synthetic hologram is generated by making a multiple exposure hologram of two point sources. These two point sources are placed in various positions for each exposure such that when the multiple exposure hologram is reconstructed, the viewer sees a virtual image of the desired object. This virtual image is in the form of a collection of points of light. Acousto-optic beam deflectors are used to move the two point sources for making the multiple exposure synthetic hologram.

The laser 10 has a resonant cavity defined by end mirrors 20 and 22. Both of these mirrors 20 and 22 are constructed so as to provide 100 percent reflectivity of the pulses of laser energy within the cavity. A continuous wave lasing medium denoted by the numeral 24 is included in the cavity. The lasing medium may be of a solid state material, a gas, or a liquid. For exemplary purposes, it will be assumed that the lasing medium is gas and the gas employed is argon. Other kinds of gases could be used, such as a helium-neon gas or any other material that supports continuous wave oscillation and has a wide enough oscillation bandwidth to support several longitudinal cavity modes. The lasing medium is energized by a DC source, which is connected to electrodes that are provided at the opposite ends of the container for the lasing medium 24, to develop, in a well-known way, the laser energy.

To form narrow pulses, the oscillating modes are phase modulated by a mode-locking device 28, which is positioned within the cavity and in alignment with the two mirrors 20 and 22. The mode-locking device 28 may be of different forms, e.g., an end mirror oscillated by a piezo electric translator, an acoustro-optic modulator or an electro-optic modulator, such as a Pockels cell or Kerr cell. In the FIG. 1 embodiment, for purposes of explanation, the mode-locking device 28 is a Pockels cell and is operated by an oscillating driving voltage signal derived from an oscillator 30 in the control system 12. The operating frequency of the oscillator 30 will be determined by the frequency at which the laser pulses move back and forth in the cavity and this, in turn, is determined by the resonate characteristics of the cavity. If the laser 10 as so far described, has a cavity length of 1.5 meters between the mirrors 20 and 22, the pulses of the laser energy will have a repetition rate equal to the reciprocal of the round-trip cavity transit time. Since the laser operates as a resonate cavity, only those modes of oscillation which are the resonate or natural modes of the cavity will be developed. Therefore, the number of resonate frequencies or longitudinal cavity modes will be determined by the lasing medium, e.g., with a Nd:YAG laser at the commencement of operation, there would be approximately 200 modes with a 1.5 meter cavity length and with a gas laser approximately 20 modes.

Figure 3:
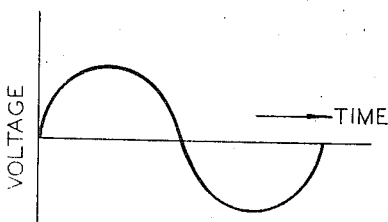
FIG. 3 is a voltage-time diagram of a driving signal employed in the holographic system.

In a well-known way the Pockels cell operates to change the polarization in accordance with the applied voltage. Therefore, upon the application of the driving signal from the oscillator 30 thereto, the polarization of the light passing through the Pockel's cell is continuously altered. When laser energy passes the Pockels cell at a certain polarization, and when a certain voltage is applied to the Pockell's cell, it will pass undeviated; i.e., without its polarization being altered. Laser energy passing therethrough under other conditions will have its polarization altered and consequently be ejected from the cavity in a way to be explained. Hence, there will be one narrow pulse of laser energy with modes locked together traveling back and forth in the cavity in exact phase with the oscillating driving signal from the oscillator 30. This can be demonstrated by referring to FIG. 3 where the driving signal is shown as a sine wave. If it is assumed that the peak positive and negative points along the voltage excursion correspond to the left and right ends of the cavity, as viewed in FIG. 1, and that the Pockels cell is calibrated to accommodate this excursion, then this narrow pulse of laser energy will be exactly in phase with this sine wave. Consequently the pulse will be at the mirror 20 when the driving signal is at its maximum positive value and at the mirror 22 when the driving signal is at its maximum negative value.

In effect, the mode-locking device 28 operates somewhat like a mechanical shutter that is opened and shut at some desired frequency so that light proceeding thereto at a time when the shutter is closed would be prevented or blocked from passing. In this way the modes are locked together to develop a narrow pulse which makes one complete round-trip of the cavity always in phase with the driving signal from the oscillator 30.

Typically in an argon ion laser 1.5 meters cavity length, the mode-locked pulses are approximately a third of nanosecond long. If the output energy from the laser is to be utilized in the holographic process, a longer pulse width, e.g., one nanosecond, is preferable because such a pulse has approximately a thirty centimeter length, which can be split in the optical system 14 and recombined without having equal path lengths for the object and reference beams. However, if the pulse is too narrow; e.g., ten centimeters long, then the recombining of the split beams at the hologram becomes more critical. For this reason there is included in the cavity a mode selection device shown generally at 32. The mode selection device 32 may be an etalon which is formed of a quartz material with highly polished ends and is adjustably rotatably mounted on some kind of gimbal. The device 32 can be adjusted manually or otherwise to lengthen the pulse to the desired 1 nanosecond length. The device 32 does this, in a well-known way, by narrowing the spectral width or the number of modes and thereby increases the temporal width of the mode-locked pulse.

As has been mentioned, the oscillator 30 drives the mode-locking device 28 at the resonate frequency of the cavity and therefore the location of the pulse in the cavity is determined by the phase of the voltage signal driving the mode-locking device 28. The usual pulse repetition rate with a mode-locked laser with the aforementioned 1.5 meter cavity length is 100 MHz. If a reduced repetition rate is wanted, e.g., 1 MHz, either some form of external output shutter would have to be positioned in the path of the coherent light being ejected from the cavity and adjusted so as to allow only every 100th pulse to pass or the cavity would have to be 150 meters long. Both of these methods are very inefficient; in fact, the external shutter would be wasting most of the laser energy. For controlling the repetition rate, the laser 10 has a pulse ejecting provision in the form of a beam-splitting polarizer 34 which can be a polarizing prism or the well-known Brewster plate. When the polarization rotator 36 is in its deactivated state, the polarization of the mode-locked pulse is such that it can pass through the polarizer 34 undeflected and thereby move back and forth in the optical cavity until it reaches a steady-state amplitude. If it is desired to remove the mode-locked pulse from the cavity, then when the mode-locked pulse is to the left of a polarization rotator 36 and traveling towards it, the polarization rotator 36 is energized by a voltage so that it rotates the polarization of the pulse by 90°. After passing through the polarization rotator 36, the mode-locked pulse will be ejected from the cavity by the beam-splitting polarizer 34 and proceed to the optical system 14. The polarization rotator 36 can be a Pockels cell, a Kerr cell or a Faraday rotator. In the FIG. 1 embodiment for exemplary purposes only, the polarization rotator 36 is a Pockels cell, to which the control system 12 provides the proper amplitude and phase voltage control signal for achieving the desired polarization of the pulse by the rotator 36 at a selected rate.

Because as explained the location of the mode-locked pulse in the cavity is determined by the phase of the driving signal, and an examination of the phase of this signal from the oscillator 30 will inform one where the mode-locked pulse is at any instant of time, the control system 12 employs the oscillator 30 to operate the control signal network 38. Included in the network 38 is a trigger circuit shown at 40 which can be the well-known Schmitt trigger. Trigger pulses from the circuit 40 are supplied at the frequency of the signal from the oscillator 30 to one the inputs of an And gate 42. The other input to the And gate 42 is connected to a trigger voltage source 44 which can be of any commercially available type that is adjustable to whatever frequency is desired; e.g., a variable frequency oscillator. Thus, if trigger signals from the circuit 40 and the source 44 are delivered simultaneously to both inputs of the And gate 42, an output will be developed and supplied to a driving circuit 45. The circuit 45 shapes and amplifies this output so that a control signal of the proper amplitude and phase is supplied to polarization rotator 36 at the time when the mode-locked pulse is advancing towards the polarization rotator 36. In effect, the occurrence of the pulse from the trigger circuit 40 indicates that the mode-locked pulse is advancing toward the polarization rotator 36 and if it is desired to eject this pulse, the trigger voltage source 44 must provide a trigger pulse also at this time so that the voltage pulse from the driving circuit 45 will energize the polarization rotator 35 and the now polarization rotated pulse of laser energy will be ejected from the cavity by the beam-splitting polarizer 34.

The pulse repetition rate of the laser 10 will be determined by the frequency adjustment of the trigger voltage source 44 and also by the frequency at which the pulse in the cavity makes a round-trip. As was explained with a 1.5 meter cavity length, the mode-locked pulse repetition rate is about 100 MHz. When a lesser repetition rate is wanted, the trigger voltage source 44 is adjusted accordingly in frequency. This reduced repetition rate allows the optical pulse to continue to oscillate in the cavity until it is desired to remove it. Hence, there is not the loss of power with the mentioned external optical shutter which would discard all of the pulses from the cavity except every 100th one if a 1 MHz rate was wanted.

Considered in a different way assume that it requires 10 nanoseconds for an optical pulse to make a round-trip in the cavity. The pulse repetition rate or the rate at which pulses are removed from the cavity can be made in any multiple 10 nanoseconds. Therefore, a part or all of a pulse can be removed at 20, 30, 40, 50, etc. nanoseconds. This only involves leaving the pulse in the cavity longer so as to reduce the pulse repetition rate and is done by the adjustment of the frequency of the trigger source 44. For instance, if an optical pulse is to be removed at 20 nanoseconds, the trigger source 44 is adjusted to provide trigger pulses at one-half the frequency of the oscillating signal from the oscillator 30.

Similarly with the argon ion laser used as an example; i.e., a 1.5 meter cavity length, a mode-locked pulse repetition rate of 100 MHz and pulses of 1 nanosecond width, the trigger source 44 would be adjusted to operate at a frequency equal to one one hundredth of the oscillator 30 frequency. The resultant pulse rate would then be 1 MHz.

The optical system 14 for developing the hologram on the photographic plate 16 includes a beam-splitting mirror 46 positioned in the path of the optical pulse and a reflecting mirror 48. Thus, the optical pulse is split at the beam-splitting mirror 46 with one part forming the object beam which proceeds to the photographic plate 16. The other part of the beam is transferred to the reflecting mirror 48 and then directed as a reference beam towards the photographic plate 16. In the well-known way the object beam and the reference beam are recorded on the photographic plate 16 as an interference fringe pattern.

Acousto-optic beam deflectors, designated generally by the numerals 50 and 52 in FIG. 1 and of the type as disclosed in the aforementioned Marom et al application, are respectively operated by an appropriately controlled computer (not shown) to control the object and reference beams. With these deflectors 50 and 52 there is the inherent problem of the frequency shifts of the light passing through these deflectors 50 and 52. Because of these frequency shifts, the object and reference beams impinge upon the photographic plate 16 at different frequencies so that either no interference fringes are recorded or they are such that a poor quality hologram is developed. With the ability of this laser 10 to develop a narrow pulse of the previously discussed width, i.e., a pulse of 1 nanosecond width or 30 centimeters long, holographic fringes having high visibility can be formed even though the object and reference beams have different frequencies. Also there is not as much concern about the beams split by the mirror 46 recombining at exactly the same time at the photographic plate 16 as there would be with a much narrower width pulse; e.g., one of 0.3 nanosecond width or 10 centimeter long. This latter pulse width renders the recombining of the beams at the photographic plate 16 critical for the recombining has to be at substantially the same time. For example, if it is assumed that the argon ion laser 10 has a 1 nanosecond pulse width and the pulses are Gaussian shaped and, further, that the acousto-optic beam deflectors 50 and 52 shift the reference beam center frequency to $\omega_1$ and the object beam frequency to $\omega_2$, then at the holographic plate 16 the object and reference beams will differ in frequency by $\Delta\omega = \omega_1 - \omega_2$. If the object and reference beam path lengths are equal and their intensities are also equal, the fringe visibility at the holographic plate 16 will be in accordance with the equation: $V = e^{-(\Delta\omega\tau/4)^2}$, where $\tau$ is the laser pulse width. With $\tau = 1.0$ nanosecond, the fringe visibility is down by a factor $1/e$ when $\Delta\omega = 4 \times 10^9$ or $\Delta f \approx 640$ MHz. Since most accousto-optic beam deflectors typically operate at frequencies of 100 MHz or less, these devices could be used in the object and or reference beams without an intolerable deterioration of fringe visibility provided the pulse width is 1 nanosecond. As has been explained this pulse width can be obtained with the described argon ion laser 10.

Briefly summarizing the operation, the DC source 26 is turned on to initiate the operation of the lasing medium 24. The operation of the mode-locking device 28 by the signal from the oscillator 30 mode locks the phases of the longitudinal cavity modes so that a pulse of laser energy is developed in the cavity and will be traveling back and forth at substantially the resonate frequency of the cavity; whereas the operation and adjustment of the mode selection device 32 provides the desired pulse width. Ejectment by the beam-splitting polarizer 34 will be at the rate determined by the trigger source 44 which will provide a trigger pulse to the And gate 42 at whatever repetition rate is selected. This will result in the polarization rotator 36 being energized, assuming that the trigger pulse from the source 44 and the Schmitt trigger 40 are supplied to the And gate 42 at the same time. These output optical pulses then are used to develop the hologram.

Figure 2:
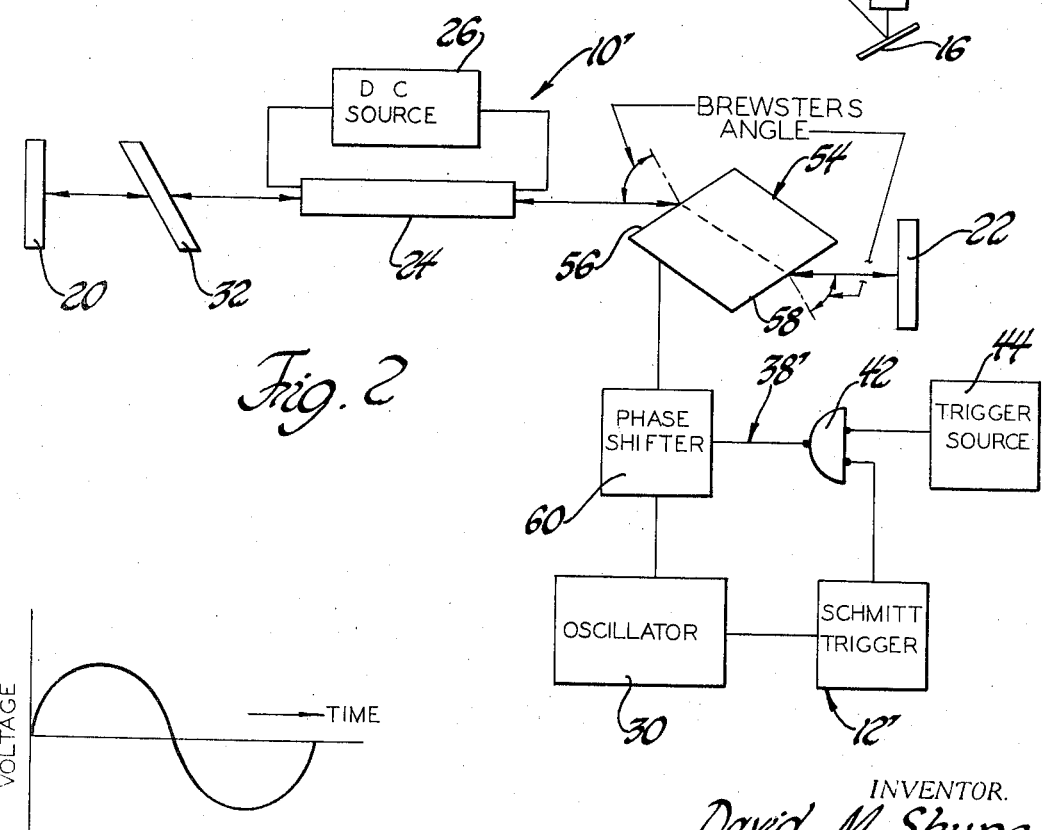
FIG. 2 is a schematic diagram of another embodiment of the FIG. 1 holographic system.

In FIG. 2, a laser denoted by the numeral 10' is shown with those parts which are the same as used in the FIG. 1 embodiment being assigned the same numeral. In this laser 10 a Pockels cell shown at 54 has faces at 56 and 58 formed at Brewster's angle. As is well understood Brewster's angle is the angle at which an optical pulse of one polarization passes without reflection. When the pulse has the proper polarization, it will be partially relfected at the window 58 which serves the function of the FIG. 1 beam-splitting polarizer 34. The Pockels cell 54 therefore serves not only as a mode-locking device to mode lock the pulses in the cavity but also as a polarization rotator and a beam-splitting polarizer and thus combines the functions of the mode-locking device 28, the beam-splitting polarizer 34, and the polarization rotator 36 in FIG. 1. As has been explained the Pockels cell 54 when energized by a voltage is operative to alter the polarization of the polarized radiation, such alteration being determined by the voltage applied. When the Pockels cell 54 is not energized, it does not affect the polarization of the laser radiation. To serve its mode-locking function, the Pockels cell 54 is provided with a driving signal from the oscillator 30 in the control system 12' at the resonate frequency of the cavity and hence, as in the FIG. 1 embodiment when performing as a mode-locker, optical pulses pass undeflected when the driving signal does not generate any polarization change. Energy arriving at other times is ejected so that this mode-locked pulse of a short duration cycles back and forth in the cavity in the same way as in FIG. 1 embodiment. Also, the mode selection device 32 can be adjusted to widen the mode-locked pulse to the desired width. When the mode-locked pulse is to be ejected from the cavity, the phase of the driving signal is altered to obtain a polarization which will combine with the Brewster's angle and result in a ejectment of the pulse at the window 58. This is done in the control signal network 38' by a suitable phase shifter 60 that is operated in proper synchronism with the movement of the pulse back and forth in the cavity. For this purpose the And gate 42 is also used along with the trigger voltage source 44 and the trigger circuit 40 to supply simultaneous pulses to the And gate 42 when the mode-locked pulse is in the proper position in the cavity for ejectment; i.e., to the left of the Pockels cell 54. At this time and in the same way as in the FIG. 1 embodiment the trigger voltage source 44 and the trigger circuit 40 both provide pulses to the And gate 42 so that the phase shifter 60 is activated to shift the phase of the driving signal from the oscillator 30. This phase shifted driving signal activates the Pockels cell 54 so as to develop the necessary polarization for ejectment of the pulse. Again the trigger voltage source 44 can be regulated in frequency to obtain the desired pulse repetition rate.

From the foregoing, it will be appreciated that the described laser employs continuous wave lasing medium but still can provide pulse width control to obtain, e.g., the optimum pulse width for the most efficient carryout of the holographic process or any other process. Also the pulse repetition rate can be controlled with little reduction in the efficiency of the operation such as by discarding ejected pulses and thereby wasting power.

What is claimed is:

1. In a laser system, the combination of means defining a laser cavity capable of generating plural mode pulses of laser energy; the laser cavity of predetermined length including a continuous wave lasing medium, a pair of substantially fully reflecting mirrors, one at each end of the cavity, mode selection means for selectively controlling the number of modes generated in the cavity, means for selectively ejecting pulses from the cavity, and a polarization rotator means having variable optical transmissivity within the cavity for mode locking the pulses in accordance with a signal applied thereto; said laser system further comprising a source of fixed frequency timing pulses, drive means for controlling the polarization rotator between a first state wherein pulses directed to the ejector means are ejected from the cavity and a second state wherein pulses directed thereto remain in the cavity, means connecting said source of timing pulses to the mode locking means and to the drive means to control said mode locking means such that the optical transmissivity varies periodically according to said fixed frequency and the ejection of pulses from the cavity is carried out at a fraction of the same frequency, and gate means operable independently of the cavity and timing pulse source for selectively gating the timing pulses to the drive means to control the times of pulse ejection.

2. Apparatus as defined in claim 1 wherein said mode selection means is capable of selectively modulating the optical pulse length of said pulses of laser energy.

3. Apparatus as defined in claim 1 wherein said ejector means comprises means for polarizing the pulses of laser energy to a preferred orientation.

4. Apparatus as defined in claim 1 further including a beam splitter disposed remote from said cavity to receive the pulses ejected therefrom and to produce subject and reference beams for reflection toward a photographic film.

* * * * *